United States Patent
Miller et al.

(10) Patent No.: US 7,228,879 B2
(45) Date of Patent: Jun. 12, 2007

(54) APPARATUS FOR DISPENSING PAINT AND STAIN SAMPLES AND METHODS OF DISPENSING PAINT AND STAIN SAMPLES

(75) Inventors: William A. Miller, Buffalo Grove, IL (US); James A. Martin, Arlington Heights, IL (US); Christopher K. Khoo, Lake in the Hills, IL (US); Jeffrey Mumford, Crystal Lake, IL (US)

(73) Assignee: Fluid Management, Inc., Wheeling, IL (US)

( * ) Notice: Subject to any disclaimer, the term of this patent is extended or adjusted under 35 U.S.C. 154(b) by 584 days.

(21) Appl. No.: 10/844,166

(22) Filed: May 12, 2004

(65) Prior Publication Data

US 2005/0252934 A1    Nov. 17, 2005

(51) Int. Cl.
*B67C 3/26* (2006.01)

(52) U.S. Cl. .................... 141/271; 141/281; 141/377; 222/476; 222/529; 222/544

(58) Field of Classification Search ............. 141/2, 141/89–92, 192, 198, 250, 254, 267, 269, 141/271, 281, 377; 222/148, 597, 598, 599, 222/476, 528, 529, 536, 544, 212; 239/106, 239/110, 112
See application file for complete search history.

(56) References Cited

U.S. PATENT DOCUMENTS

| | | | |
|---|---|---|---|
| 5,083,591 A | | 1/1992 | Edwards et al. |
| 5,095,958 A | * | 3/1992 | Tincati ............ 141/91 |
| 5,328,057 A | | 7/1994 | Hellenberg et al. |
| 5,390,714 A | | 2/1995 | North, III et al. |
| 5,542,572 A | | 8/1996 | Davis |
| 5,562,129 A | * | 10/1996 | Graffin ............ 141/90 |
| 5,622,692 A | | 4/1997 | Rigg et al. |
| 5,632,314 A | | 5/1997 | Koppe et al. |
| 5,690,252 A | | 11/1997 | Oleksiewicz et al. |
| 5,697,527 A | | 12/1997 | Altieri, Jr. et al. |
| 5,711,458 A | | 1/1998 | Langeveld et al. |
| 5,782,274 A | * | 7/1998 | Kaneko et al. ............ 141/90 |
| 5,784,854 A | * | 7/1998 | Mazzalveri ............ 53/50 |
| 5,785,960 A | | 7/1998 | Rigg et al. |
| D401,246 S | | 11/1998 | Langeveld et al. |

(Continued)

FOREIGN PATENT DOCUMENTS

EP    0283137 A1    9/1988

(Continued)

*Primary Examiner*—Timothy L. Maust
(74) *Attorney, Agent, or Firm*—Miller, Matthias & Hull (57) ABSTRACT

An improved fluid dispenser specially adapted to provide sample-size amounts of a fluid mixture is shown and described. An automated closure and seal system is provided for the manifold that moves, on command from a controller, from a closed or sealed position thereby limiting exposure of the manifold and fluid outlet nozzles from the ambient atmosphere, to a dispense system where a sample-size container is held up against and engaging a lower end of the manifold for a sealing element disposed on a lower portion of the manifold. When the dispense is complete, the system automatically moves back toward a closed position where the filled container is held open and ready to be removed by a technician before it is capped and labeled.

34 Claims, 10 Drawing Sheets

U.S. PATENT DOCUMENTS

| | | | |
|---|---|---|---|
| 5,842,641 A | 12/1998 | Mazzalveri | |
| 5,865,221 A * | 2/1999 | Ludwig et al. | 141/31 |
| 5,903,465 A | 5/1999 | Brown | |
| 5,945,112 A | 8/1999 | Flynn et al. | |
| 5,992,691 A | 11/1999 | Post et al. | |
| 6,003,731 A | 12/1999 | Post et al. | |
| 6,089,538 A | 7/2000 | Shirkhan | |
| 6,221,145 B1 | 4/2001 | McClain | |
| 6,267,157 B1 * | 7/2001 | Gruson et al. | 141/90 |
| 6,273,298 B1 | 8/2001 | Post et al. | |
| 6,398,513 B1 | 6/2002 | Amsler et al. | |
| 6,412,658 B1 | 7/2002 | Bartholomew et al. | |
| D461,108 S | 8/2002 | Bartholomew et al. | |
| D465,810 S | 11/2002 | Bartholomew et al. | |
| 6,510,366 B1 | 1/2003 | Murray et al. | |
| D472,253 S | 3/2003 | Reedy et al. | |
| 6,540,486 B2 | 4/2003 | Amsler et al. | |
| 6,615,881 B2 | 9/2003 | Bartholomew et al. | |
| 6,622,064 B2 | 9/2003 | Bartholomew et al. | |
| D485,310 S | 1/2004 | Bartholomew et al. | |
| 6,672,341 B2 | 1/2004 | Bartholomew et al. | |
| 2001/0047309 A1 | 11/2001 | Bartholomew et al. | |
| 2002/0010528 A1 | 1/2002 | Bartholomew et al. | |
| 2003/0060925 A1 | 3/2003 | Bartholomew et al. | |
| 2003/0062379 A1 | 4/2003 | Bartholomew et al. | |
| 2003/0090176 A1 | 5/2003 | Bartholomew et al. | |
| 2003/0230355 A1 | 12/2003 | Bartholomew et al. | |

FOREIGN PATENT DOCUMENTS

| | | |
|---|---|---|
| EP | 0947699 A1 | 10/1999 |
| EP | 0992450 A1 | 4/2000 |
| EP | 1090679 A1 | 4/2001 |
| EP | 08-00858 B1 | 7/2002 |
| EP | 1134186 B1 | 5/2003 |
| WO | WO-01-75586 A1 | 10/2001 |
| WO | WO-03-026458 A2 | 4/2003 |
| WO | WO-03/031161 A1 | 4/2003 |
| WO | WO-03/031280 A1 | 4/2003 |
| WO | WO-03/083334 A1 | 10/2003 |

* cited by examiner

APPARATUS FOR DISPENSING PAINT AND STAIN SAMPLES AND METHODS OF DISPENSING PAINT AND STAIN SAMPLES

TECHNICAL FIELD

An improved apparatus for dispensing sample-size amounts of fluid mixtures is shown and described. The improved apparatus may be adapted to dispense both sample-size amounts of fluid mixtures as well as larger quantities of said mixtures. A particular mixture is selected and retrieved from the memory of the controller and then dispensed into a sample bottle that is accommodated in a holder that is part of an automated mechanical closure system that places the bottle beneath the dispensing manifold. After the selected fluid mixture is dispensed, the bottle is automatically moved out from under the manifold, the manifold is automatically enclosed or sealed by a plug or cap, the operator places a cap on the sample bottle and the system prints a label for identifying the particular fluid mixture in the sample bottle. The bottle may then be placed in a shaker for mixing. If the consumer is satisfied after testing the sample, the label is then used to duplicate the fluid mixture in a larger quantity. The system also includes an improved cabinetry and rack system for accommodating a large number of fluid ingredients to be dispensed.

BACKGROUND

Systems for dispensing a plurality of different fluids into a container have been known and used for many years. For example, systems for dispensing paint base materials and colorants into a paint container are known. These paint systems may use twenty or more different colorants to formulate a paint mixture. Each colorant is contained in a separate canister or package and may include its own dispensing pump. The colorants and the respective pumps may be disposed on a turntable or along one or more horizontal rows. In a turntable system, the turntable is rotated so that the colorant of to be dispensed is moved to a position above the container being filled. In designs using one or more horizontal rows, the container may be moved laterally to the appropriate colorant/pump.

Systems for dispensing large varieties of different fluids are not limited to paints, but also include systems for dispensing pharmaceutical products, hair dye formulas, cosmetics or all kinds, nail polish, etc. Smaller systems for use in preparing products at a point of sale may use a stationary manifold through which a plurality of nozzles extend. Each fluid to be dispensed is then pumped through its individual nozzle. Depending upon the size of the container and the quantity of the fluids to be dispensed, manifolds can be designed in a space efficient manner so that a single manifold can accommodate twenty or more different nozzles. The nozzles are connected to the various ingredients by flexible hoses and the ingredients are contained in stationary canisters or flexible packages that are typically contained and supported within a box structure.

Currently available automated fluid dispensing systems may include a controller linked to each of the pumps that are connected to the ingredient canisters or packages. Various formulations may be stored in the memory of the controller and, upon recall, the system can dispense a selected formulation.

Referring generally to the paint and stain retail industry, a problem exists in that consumers are often unable to adequately determine how an actual paint color (i.e., a selected paint formulation) or a stain color (i.e., a selected stain formulation) will look on the applied surface based upon the consumer's impression of the color from a color wheel or color "swatch." Simply put, the consumer is often surprised how the selected paint formulation actually looks on the wall or other surface. The same is true with respect to stains. Often, the consumer is surprised as to how the actual selected stain formulation looks once it has been applied to a wood surface or other substrate.

To solve this problem, paint retailers are required to sell paint and stain in relatively small sizes, such as a quart or a pint. However, a quart, a pint or even a cup of paint or stain generally far exceeds the actual amount a consumer needs to test a color on a wall or other surface. Currently, paint retailers have no convenient means for providing paint formulations in small bottles or containers such as one or two fluid ounces.

Another problem associated with dispensing systems that make use of nozzles lies in the dispensing of relatively viscous liquids such as tints, colorants and base materials for paints that have relatively high viscosities. Specifically, the viscous fluids have a tendency to dry and cake onto the end of the nozzles, thereby requiring frequent cleaning in order for the nozzles to operate effectively. If the nozzles are not cleaned regularly, they may clog thereby causing a build-up of pressure in the line which may be eventually overcome by the pump resulting in a violent splattering of fluid during a dispense. While some mechanical wiping or scrapping devices are available, these devices are not practical for multiple nozzle manifold systems because of cross contamination of ingredients that are dispensed from the separate nozzles and further the scraper or wiper element must be manually cleaned anyway.

Another problem associated with the dispensing of paints and stains is unwanted dripping from the nozzles after a dispense operation is completed. A drip "hanging" from a nozzle may mean that the previous formulation was not accurately dispensed. Further, dripping of tints or colorants on the dispenser between dispensing operations results in an unsightly appearance that must be cleaned, particularly when the dispenser is used in a retail environment. Also, a drip hanging from a nozzle may find its way into a subsequently dispensed formulation, thereby compromising the accuracy of the subsequently dispensed formulation.

One solution would be to find a way to provide an enclosing seal around the nozzle or manifold after the dispensing operation is complete. In this manner, the viscous materials being dispensed through the nozzles would have less exposure to air thereby requiring a lower frequency of cleaning operations. To date, applicants are not aware of any attempts to provide any sort of nozzle or manifold closure or sealing element for a paint or stain dispenser that would protect against unwanted drips, that would reduce the frequency in which the nozzle or manifolds must be cleaned and that would also accommodate small, sample-sized containers.

SUMMARY OF THE DISCLOSURE

In satisfaction of the aforenoted needs, an improved paint or stain formulating and dispensing system is disclosed. In the improved system, a plurality of paint or stain formulations are stored in the memory of a controller of the system. When a consumer selects a color, based upon a color wheel, color swatches or other sample indicia, the consumer requests a small sample of the formulation from a sales technician. The sales technician may then go to the dispensing system, enter an identifier for the selected color into the controller through a keyboard, touch screen or other input means. The controller, which is linked to each pump which through each pump's motor and each pump is connected to a supply canister or bag of a single ingredient, the controller sequentially or simultaneously operates the pumps to dispense a sample size of the selected formulation into a sample bottle. After the dispensing is complete, the technician then applies a cap or top to the bottle or sample container and the system prints a label with an identifier of the formulation contained in the sample bottle for placement on the outside of the sample bottle. The bottle may then be taken to a paint shaker or mixer for proper mixing. The disclosed system, as described below, may be adapted to provide sample-size amounts of selected formulations, such as one or two fluid ounces, as well as larger quantities such as pints, quarts and gallons. The disclosed system may also be adapted for metric volumes as well.

One feature of the disclosed system is the improved closure system for the fluid outlet. While the disclosed closure system is directed primarily at paint and stain dispensing machines, the disclosed closure system for the fluid outlet as described herein is also applicable to other fluid dispensing apparatuses that dispense particularly viscous fluids.

In an refinement, an improved closure system for a fluid outlet of a fluid dispensing apparatus comprises a pivot plate having an opening for accommodating a lower end of a manifold. The pivot plate also comprises a front portion and a rear portion with the manifold opening disposed therebetween. The front portion of the pivot plate is pivotally connected to an upper portion of a front link and the rear portion of the pivot plate is pivotally connected to a middle portion of the rear link.

The lower portions of the front and rear links are pivotally connected to front and rear portions of a holder plate respectively to permit pivotal movement of the holder plate below and with respect to the pivot plate. Typically, the pivot plate rests on and is supported by a support plate and the holder plate is disposed below the support plate. The support plate includes openings for accommodating the front and rear links which connect the pivot plate the holder plate.

The front portion of the holder plate comprises a means for accommodating or gripping a sample container. The holder plate also comprises a central opening for accommodating a plug which will be described below.

In one embodiment, an upper portion of the rear link comprises an elongated slot for receiving an output end of a crank having an input end that is coaxially connected to a motor shaft of a motor. Spinning rotational movement of the shaft and the input end of the crank about a common axis results in rotational movement of the output end of the crank along an arc concentric with the common axis of the crank and motor shaft.

In another embodiment, the upper portion of the rear link comprises an arcuate gear segment that is enmeshed with a drive gear mounted on the motor shaft. Rotational movement of the motor shaft and drive gear about the axis of the motor shaft results in movement of the arcuate gear segment about an axis defined by the connection between the rear link and the pivot plate.

Similarly, in yet another alternative embodiment, the motor shaft is connected to a worm gear which, in turn, is enmeshed with an arcuate gear segment connected to an upper portion of the rear link to achieve the same movement as described above with respect to the alternative embodiment having the arcuate gear segment enmeshed with the drive gear mounted on the motor shaft. In this embodiment, the "worm" is mounted on the motor shaft and the arcuate gear segment of the rear link serves as the worm gear.

The plug has a closed bottom and an open top. The container holder of the holder plate accommodates an open sample-sized container having an upper rim that is generally parallel with the open top of the plug but spaced in front thereof.

In a refinement, the plug receives a disposable line or cup that captures drips and that can be discarded thereby eliminating the need to clean the plug.

The closure system is operable between at least two positions including a dispense position and a closed position. In a closed position, the plug engages the lower end of the manifold and limits the exposure of the manifold and nozzle outlets to the ambient atmosphere. Rotation of the motor shaft results in the plug and container being moved downward and rearward followed by an upward movement until the upper rim of the container engages the manifold and the plug is disposed rearwardly of the manifold thereby placing the system in a dispensed position. Reverse movement of the motor returns the system to a closed position with the now-filled container forward of the manifold and ready to be removed by the operator, closed with a cap and labeled with an appropriate indicia indicating the formulation contained within the container.

In the preferred refinement, the open top of the plug mateably receives the lower end of the manifold to isolate the manifold from the ambient atmosphere when the system is in a closed position. In another preferred refinement, either the open top of the plug or the lower end of the manifold comprises a seal ring to provide a seal between the plug and the manifold when the system is in the closed position. This seal ring can also act to provide a seal against the container rim when the system is in the dispensed position to reduce or eliminate the possibility of splashing outside of the container during the dispense operation.

In a refinement, the front portions of the pivot and holder plates are connected to two parallel links. Further, the motor may be a stepper motor which may comprise up to 200 steps, 400 steps or 400½ steps. The use of a stepper motor enables the system to be adjusted so as to effectuate a seal between the open top of the plug and the manifold when the system is in a closed position and/or between the upper rim of the container and the lower end of the manifold when the system is in a dispensed position.

In a refinement, the container holder of the holder plate comprises a horizontal c-shaped opening at the front portion of a container holder for frictionally receiving and engaging a sample-sized container so that the upper rim of the container is held in a position generally parallel to the open top of the plug.

In another refinement, the manifold accommodates a plurality of nozzles, with each nozzle being connected to an outlet of a pump in a conventional manner, such as a flexible hose. Each pump is then connected to a container which holds either base material or one of a variety of tints. Preferably, the base materials and tints are contained within a flexible package that is supported in a suitable holder such as a box or an improved bracket as described below. As noted above, each pump is linked to a controller having a memory with the memory storing a plurality of formulas that may be easily recalled by an operator. The controller is also linked to an input device for enabling the operator to select from one of a plurality of color formulas. The formulas relate to a particular paint or stain color.

Also as noted above, the controller is preferably linked to a printer which prints a label identifying the selected formula which is then placed on the sample container so that if the consumer decides to buy a larger quantity of the selected formula, said formula may be easily identified by the label on the sample container.

Also as described below, the plurality of flexible packages and pumps are housed in a cabinet disposed below the manifold, closure system, motor, printer, and input device.

In another refinement, the disclosed closure system for a fluid outlet of a fluid dispensing apparatus as described above is incorporated into a paint or stain formulating a dispensing system. In yet another refinement, the disclosed closure system is incorporated into a cosmetics dispensing system, a pharmaceutical dispensing system, a hair dye dispensing system or other fluid dispensing systems that could benefit from the use of a cover or closure for a fluid manifold between dispensing operations.

In another refinement, an improved method for preparing a paint or stain sample is disclosed. The improved method comprises: providing a dispensing system in accordance with that described above with the holder plate and plug in a closed position; storing a plurality of paint or stain formulations in a memory of a controller, each formulation being associated with an identifier; providing a plurality of colorants in at least one base material in separate reservoirs, each reservoir being connected to a separate pump which is connected to a separate nozzle, each pump and the motor of the closure system being linked to a controller; entering a selected identified into an input device coupled to the controller; mounting a sample container onto the container holder; moving the holder plate and sample container to a dispensed position; dispensing the formula associated with the selected identifier into the sample container; and returning the holder plate and plug to the closed position as described above.

The method may also comprise linking a printer to the controller and printing the label with indicia identifying the formula dispensed and adhering the label to the sample container. In a further refinement, the indicia is a bar code and the controller is linked to a bar code reader for easy retrieval of the selected formulation at a later time. In still a further refinement, the method may comprise reading the bar code of a label adhered to a sample container and dispensing a larger quantity of the formula associated with the bar code into a larger non-sample-sized container. In a further refinement of this concept, the dispensing of the larger quantity into the non-sample-sized container may be carried out at the same dispensing apparatus or using a different dispensing apparatus.

In a refinement, another improved method of preparing a paint or stain sample is disclosed which comprises: storing a plurality of paint or stain formulations in a memory of a controller, each formulation being associated with identifier; entering a selected identifier into an input device coupled to the controller; dispensing a sample amount of the formula associated with the selected identifier into a sample container; printing a label with indicia identifying the formulation dispensed and adhering the label to the sample container; at a later time, after the consumer has decided to purchase a larger quantity of the selected formulation, reading the indicia on the label of the sample container to identify the formulation previously dispensed to select said formulation; and dispensing a larger quantity of the formulation into a larger container.

In another refinement, an improved modular shelving system for housing and supporting flexible bags containing fluid components is disclosed. The improved shelving system comprises a cabinet comprising an interior with a pair of parallel cross beams. The shelving system also includes a plurality of brackets slideably and detachably mounted on the cross beams. Each bracket comprises a unshaped body comprising a rearwall disposed between and connected to two sidewalls. The rearwall and sidewalls each comprise a pair of slots. Each slot extends through the rearwall and into the sidewall through receiving one of the cross beams through the rearwall and accommodating the cross beam in the sidewalls. Each slot further comprises a pair of shaped recesses disposed in the sidewalls while frictionally receiving one of the cross beams. One of the sidewalls also is connected to a forwardly extending arm. The arm is detachably connected to a holder for supporting a flexible bag.

In a refinement, the rearwall of each bracket is connected to a motor and each motor is connected to a pump for pumping fluid from the flexible bag. Each pump comprises an inlet valve that is mateably received in an outlet of the fluid bag accommodated in the holder. In a further refinement, each pump motor is connected to a motor plate and each motor plate is connected to the rearwall of its respective bracket with a vibration absorbing layer disposed therebetween.

In another refinement, each bag is contained within a box which is received in the holder with the outlet of the bag directed toward the inlet valve of the pump.

In another refinement, the shelving system comprises two pairs of cross beams, spaced apart within the cabinet and generally parallel to each other so that two parallel rows of brackets, holders, pumps, motors and bags may be disposed within the cabinet.

BRIEF DESCRIPTION OF THE DRAWINGS

The disclosed embodiments and methods are described more or less diagrammatically in the accompanying drawings, wherein.

While a single embodiment of the dispensing system, closure system therefore and shelving system therefore is shown and described and further while the present application is directed primarily at the dispensing of sample amounts and larger amounts of paints and stains, it will be noted that the disclosed dispensing system and dispensing methods are clearly applicable to the dispensing of other liquid materials that are formulated from a plurality of different liquid components. Further, alternative embodiments and variations to the embodiments disclosed herein will be apparent to those skilled in the art.

DETAILED DESCRIPTION OF THE PRESENTLY PREFERRED EMBODIMENTS

Figure 1:
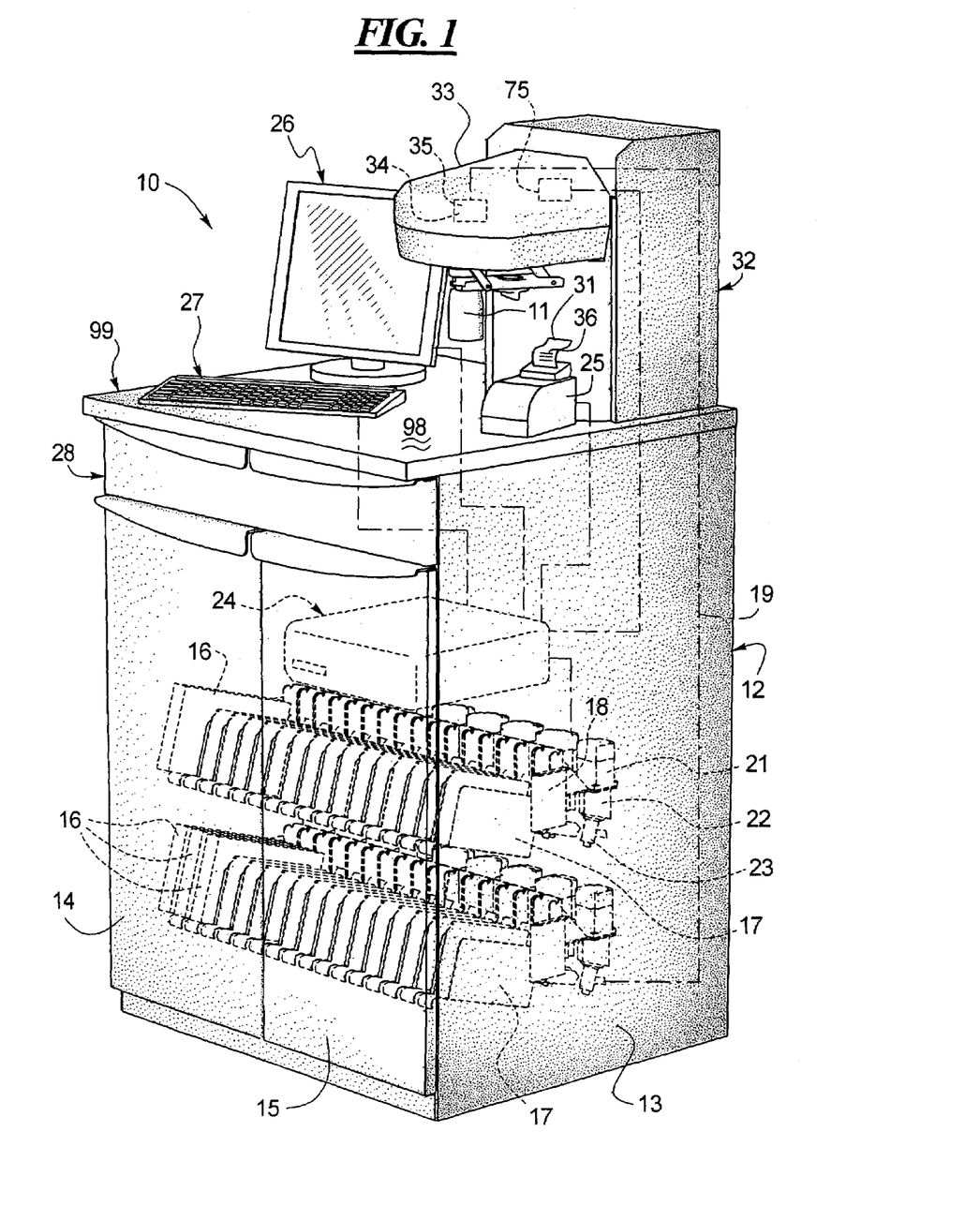
FIG. 1 is a perspective view of an improved fluid dispensing apparatus made in accordance with this disclosure illustrating certain parts of the dispenser, closure system for the dispenser, control system, shelving system and improved racks or brackets for supporting fluid ingredients provided in bags disposed within enclosing boxes.

Turning to FIG. 1, a dispensing system 10 is illustrated which may be used to dispense sample-sized formulations, such as paint and stain formulations or other liquid products, into a sample-sized container 11 as well into larger containers (not shown). The system 10 includes a lower cabinetry 12 which includes a pair of opposing sidewalls, one of which is shown at 13 that are hingedly connected to front doors shown at 14, 15. The cabinetry 12 is preferably designed to house a plurality of different fluid components such as those contained within a flexible bag (not shown) disposed within a box 16. As shown generally in FIG. 1, the fluid components housed within the boxes 16 are supported by a plurality of holders shown at 17 which, in turn, are supported by brackets shown at 18, each of which is connected to a motor 21 which, in turn, operates a separate pump 22 which, in turn, is connected to the fluid reservoir (not shown) disposed within a box 16 by the nozzle assembly shown at 23. The relationship between the fluid reservoirs disposed within the boxes 16 and pumps 22 as well as the relationship between the holders 17 and brackets 18 will be discussed below with FIGS. 6–11.

The cabinet 12 may also house a controller 24 which is linked to each motor 21 as well as the printer 25, monitor 26 and keyboard 27. It will also be noted that a touch-screen type monitor 26 may be employed thereby possibly eliminating the need for a separate keyboard 27. The controller 24 may also be housed within the drawer 28 but it will also be noted that the drawer 28 is a convenient place to store supplies such as additional sample containers 11 and printing labels 31.

Still referring to FIG. 1, it will be noted that in addition to the controller being linked to each motor 21 which controls each pump 22 which draws fluid from each fluid reservoir which is disposed within each box 16, the pumps 22 are each connected to a flexible hose, one of which is schematically shown at 19 which extends upward through the housing 32 which is connected to the hood 33. The hoses extend through the housing 32 and hood 33 and downward through a block 34 which is connected to a manifold 35 as shown in detail in FIG. 2.

Figure 2:
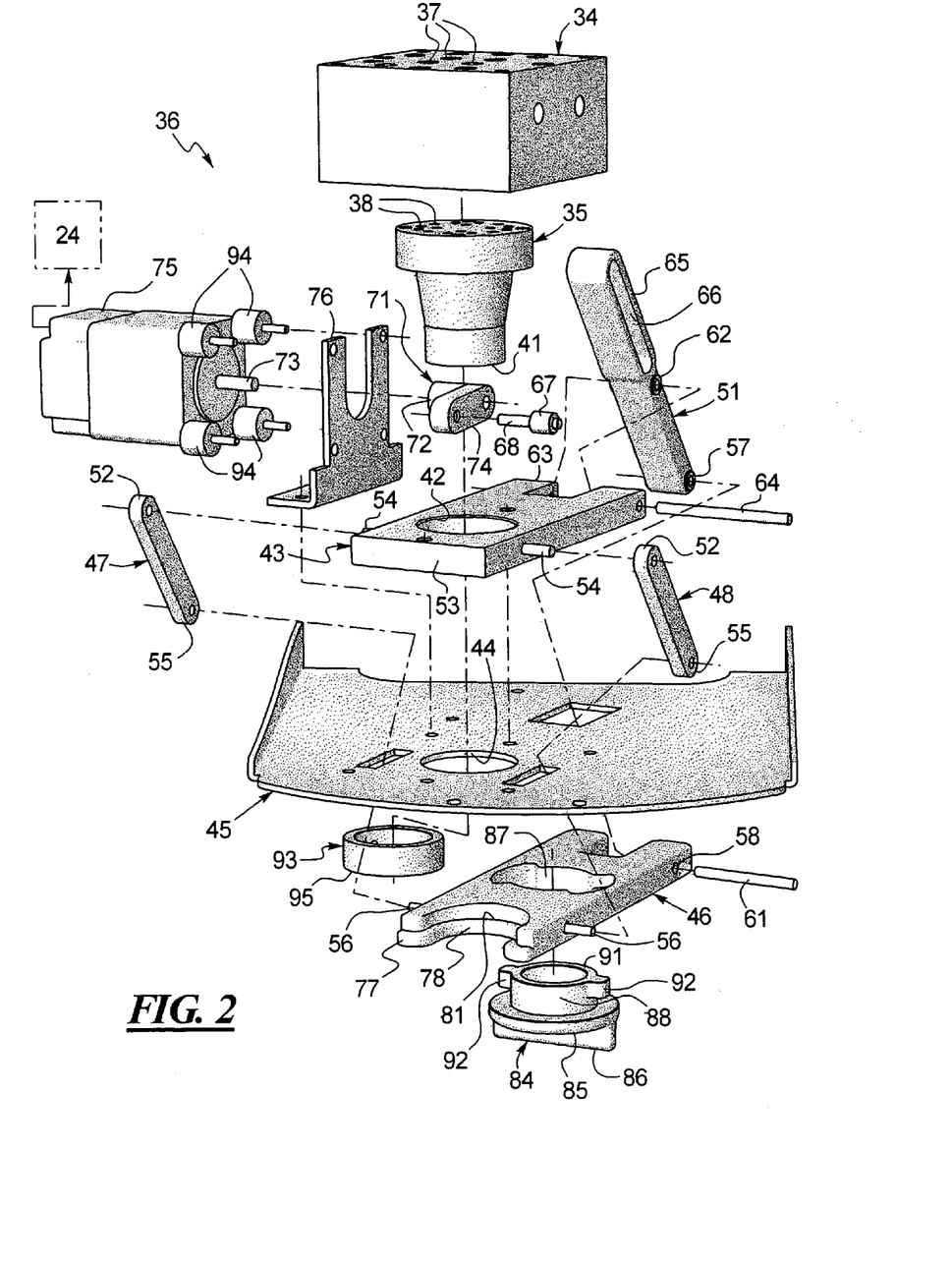
FIG. 2 is an exploded view of the closure system for the manifold of the dispensing apparatus illustrated in FIG. 1.

Referring now to FIG. 2, an improved closure system 36 is disclosed. The manifold block 34 receives a plurality of flexible hoses 19 (FIG. 1) in the openings shown at 37. At the underside of the manifold block 34 (not shown), an opening is provided for receiving the manifold shown at 35. The openings 37 of the manifold block are in fluid communication with the openings 38 in the manifold 35 which, in turn, accommodate nozzles (again now shown). In the embodiment shown, the manifold block 34 and manifold 35 provide fluid pathways for about twenty different fluids or ingredients. Of course, different manifold blocks 34 and manifolds 35 may be designed to accommodate additional or fewer ingredients thereby increasing or decreasing the number of holes or passages shown at 37, 38.

Figure 3:
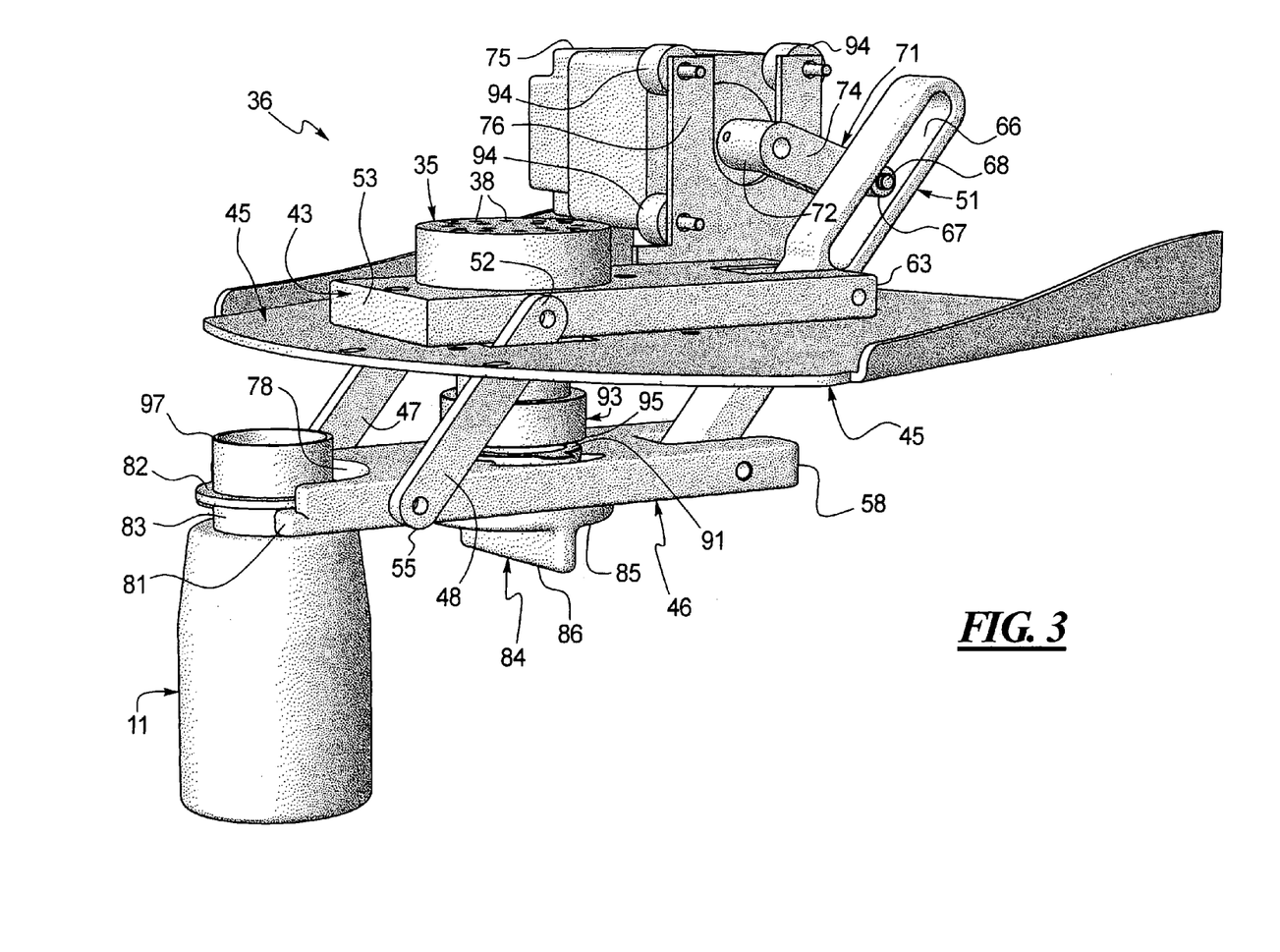
FIG. 3 is a side perspective view of the closure system illustrated in FIG. 2 in a closed position.

Referring primarily to FIG. 2 with reference to FIGS. 3–5A, the manifold 35 includes a lower end 41 that extends through the opening 42 in pivot plate 43 as well as through the opening 44 in the support plate 45. Referring to FIGS. 2 and 3 together, it will be noted that the pivot plate 43 sits on top of the support plate 45 and the manifold 35 extends through the pivot plate 43 and support plate 45. The pivot plate 43 is linked to a holder plate 46 by the front links 47, 48 and the rear link 51.

More specifically, the upper ends 52 of the front links are pivotally connected to the front end 53 of the holder plate by the pins shown at 54 which may be a single pin extending through the pivot plate 43 or separate pins. Further, the pins 54 may be spring-biased in the outwardly position as shown in FIG. 2. The lower end 55 of the front links 47, 48 are similarly pivotally connected to the front end of the holder plate 46 by the pins shown at 56 but it will also be noted that a single pin 56 may extend through the holder plate 46 or the pins at 56 may be separate elements either fixedly attached to the holder plate or connected to the holder plate 46 by some sort of spring-bias arrangement.

In the embodiment shown in FIGS. 1–5A, the rear link 51 also includes a lower end 57 that is connected to the rear end 58 of the holder plate by the pin or shaft shown at 61. A mid-portion 62 of the rear link 51 is connected to the rear end 63 of the pivot plate 43 by the pin or shaft shown at 64. An upper end 65 of the rear link 51 defines an elongated slot 66. The elongated slot 66 receives the bushing 67 that is mounted on the pin or shaft 68 which, in turn, is connected to the crank shown at 71. The crank 71 includes an axial portion 72 that mateably receives and is connected to the motor 73 and the radial arm 74 that is connected to the shaft 68 which, in turn, is connected to the bushing 67. The motor 75 for rotating the crank 71 is connected to a mounting plate 76 which, in turn, is connected to the support plate 45 as shown.

The front end 77 of the holder plate 46 includes a shaped recess 78 that includes a step 81 for supporting a flange 82 disposed on the neck 83 of the sample container 11 as best seen in FIG. 3. To secure the container 11 to the holder plate 46, the operator merely pushes the container 11 with the flange 82 disposed just above the step 81 so that the neck 83 is frictionally received in the recessed 78 and the flange 82 is supported by the step 81.

The holder plate 46 also accommodates the closure element or plug 84. The plug 84 includes a closed bottom 85 that features a transverse rib 86 that can be easily gripped by an operator so that the plug 84 may be inserted upward through the shaped opening 87 that extends through the holder plate 46. The open upper end 88 of the plug 84 features an upper rim 91 and two diametrically opposed tabs 92. The combination of the tabs 92 of the plug 84 and the shaped opening 87 of the holder plate 46 provide a twist-lock connection between the plug 84 an the holder plate 46 to enable the plug 84 to be easily and detachably connected to the holder plate 46 as shown in FIGS. 3–5.

In a preferred embodiment, to effectuate a seal between the lower end 41 of the manifold 35 and the upper end 88 or upper rim 91 of the plug 84, a sealing ring 93 is provided. The sealing ring may be an integral part of the lower end 41 of the manifold 35 or the sealing ring 93 may also be an integral part of the upper end 88 of the plug 84. In the embodiments shown in FIGS. 2 and 3–5, the sealing ring 93 is a separate element and is secured to the lower end 41 of the manifold 35 as best seen in FIG. 4. Finally, as also shown in FIG. 2, to reduce vibration caused by activation of the motor and rotation of the crank 71, vibration-absorbing bushings shown at 94 may be disposed between the motor 75 and the motor mounting plate 76.

Figure 4:
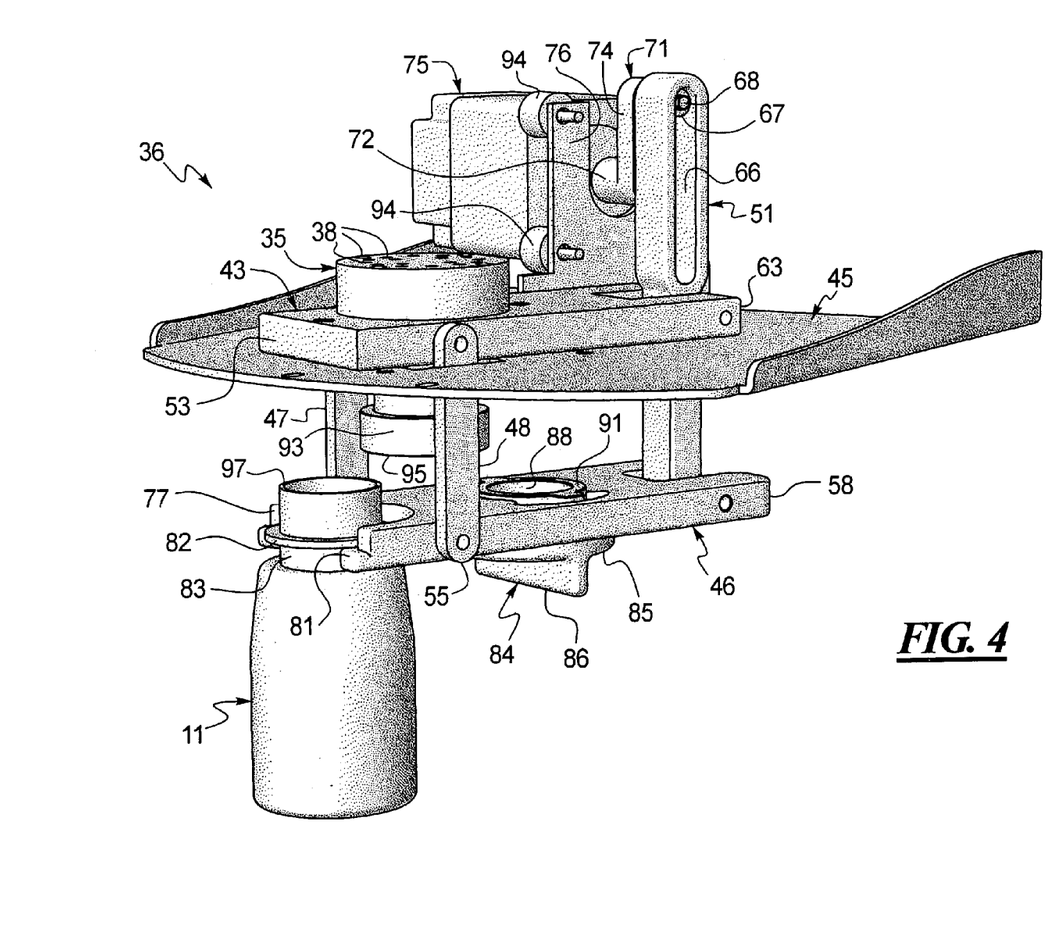
FIG. 4 is another side perspective view of the closure system shown in FIGS. 2 and 3 with the apparatus in a position between the closed position illustrated in FIG. 3 and the dispense position illustrated in FIG. 5.

Turning to the operation of the closure system 36 as illustrated in FIGS. 3–5 and turning first to FIG. 3, the closure system 36 is illustrated in the closed or sealed position. Crank 71 has been rotated so that the rear link 51 has moved the holder plate downward, forward and then upward towards a position where the upper rim 91 of the plug 84 is about to engage the lower rim 95 of the seal element 93. A small gap between the upper rim 91 of the plug 84 and the lower rim 95 of the seal element 93 is shown in FIG. 3 for illustration purposes. In a fully closed or sealed position, these two surfaces would engage each other to reduce the exposure of the lower end 41 of the manifold to the ambient atmosphere.

Preferably, the motor 75 is a stepper motor whereby a rotation of the motor shaft 73 or crank 71 is divisible into a significant number of steps such as 200 steps, 400 steps or 400½ steps. Thus, operation of the motor 75 by the controller 24 can be adjusted by as little as one step or a 1 step so that rotation of the crank 71 will stop as soon as the surfaces 91, 95 engage one another as the system 36 arrives at the closed or sealed position. The motor 75 could also be a DC or AC motor with its operation controlled by sensors, limit switches or a timing mechanism.

Figure 5A:
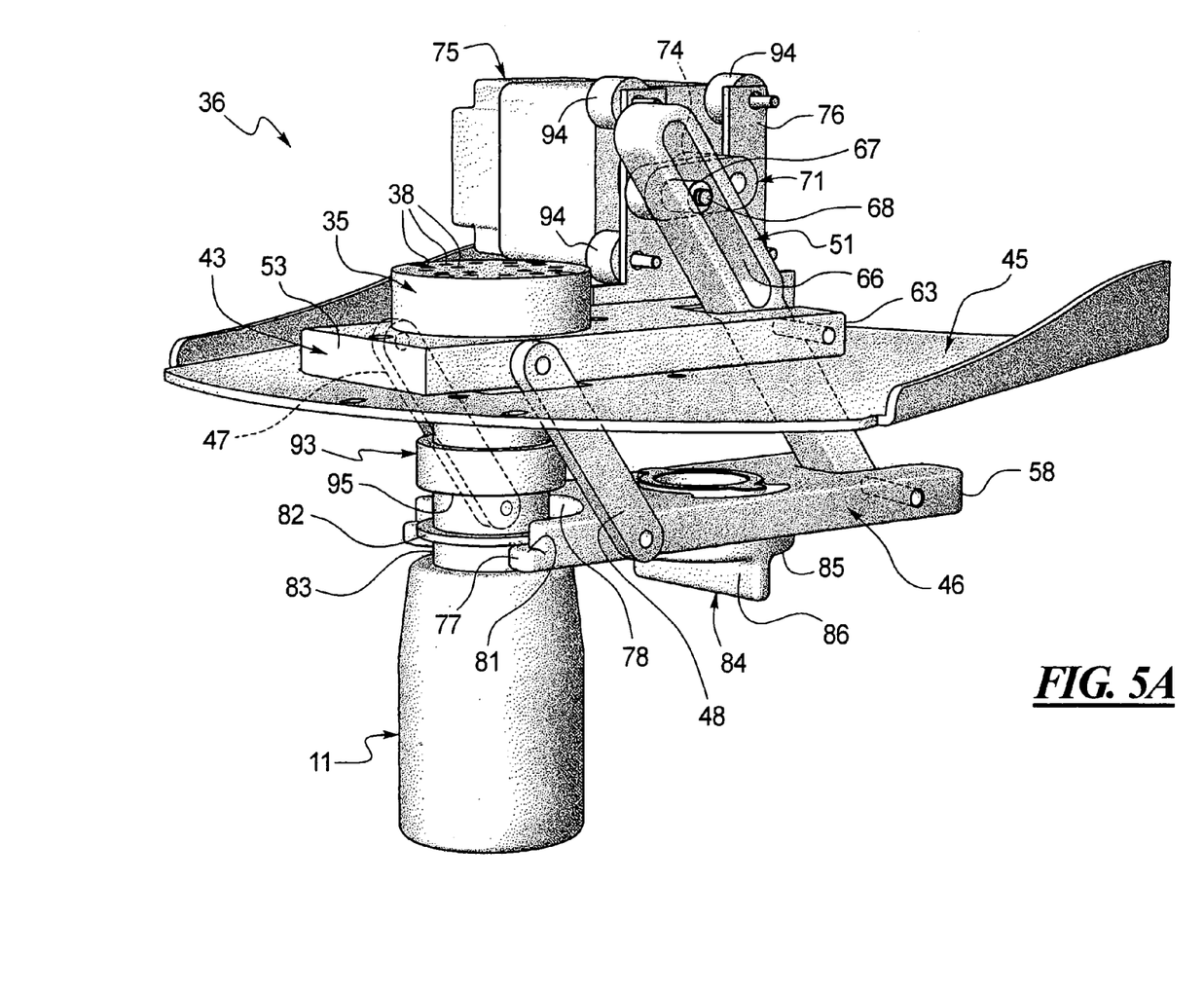
FIG. 5A is another side perspective view of the closure system illustrated in FIGS. 2–4 with the closure system in the dispense position.

Turning to FIG. 4, to move the closure system 36 from the closed or sealed position shown generally at FIG. 3 (with the exception of the surfaces 91, 95 not quite being in abutting contact or in a sealing relationship with one another), the stepper motor 75 rotates the crank 71 in a counter-clockwise direction as shown in FIG. 4. This movement results in an initial downward and rearward movement of the holder plate 46 thereby disengaging the plug 84 from the sealing element 93 as shown in FIG. 4. By "counter-clockwise," this term is used in reference to viewing the system 36 from the right side as illustrated in FIGS. 3–5. In the position shown in FIG. 4, the system 36 is moving towards the dispense system shown in FIG. 5A.

Continued counter-clockwise rotation of the crank 71 by the motor 75 results in the system 36 arriving at the position shown in FIG. 5 with the upper rim 97 of the container 11 (see FIGS. 3 and 4) engaging or being mateably received within the lower rim 95 of the sealing element 93. In the dispensed position shown in FIG. 5A, fluid may be transmitted through the block 34 (FIG. 2) and through the manifold 35 without any substantial possibility of fluid not reaching the interior of the container 11. Any splashing that may result from clogged or dirty nozzles or manifolds will also be at least substantially contained. Again, should the system 36 not arrive at the dispensed position shown at FIG. 5A with the upper rim 97 of the container 11 engaging or being mateably received within the lower rim 95 of the seal (depending upon the design), the use of a multi-stepper motor 75 enables adjustment to the system by way of commands made through the controller 24. Again, fewer or more steps may be added to the partial rotational movement between the closed (FIG. 3) and dispensed (FIG. 5A) positions. To move from the dispense position shown in FIG. 5A to the closed system shown in FIG. 3, the motor 75 simply reverses the rotation of the crank 71 under the control of the controller 24.

In addition to providing a closure or seal around the lower end 41 of the manifold 35, the closure system illustrated in FIGS. 2–5A is also adaptable for dispensing into a larger container than the sample-sized container 11 illustrated. Specifically, without dismantling the closure system 36, a sample-sized container 11 can be removed or simply not inserted into the front end 77 of the holder plate 46 initially, and the system can be moved to the dispensed position shown in FIG. 5A and the larger container can may be placed on the upper surface 98 of the supporting platform 99 as shown in FIG. 1. In such a situation, it may be advisable to move or relocate the printer 25. Thus, the system 10 and the closure system 36 of the system 10 are adaptable for filling small sample-sized containers 11 containing a few fluid ounces to larger containers such as one gallon containers. Further, by changing the height of the housing 32 with respect to the surface 98 (see FIG. 1), the system could easily be adapted to accommodate the filling of larger five-gallon pails as well.

Again, while one specific use for the dispenser 10 as shown and described will be the dispensing and formulation of paint and/or stains of various colors, it will be apparent to those skilled in the art that the dispenser 10 is clearly adaptable to other uses where a plurality of liquids are added to a container in a fast, efficient and accurate manner.

Figure 5B:
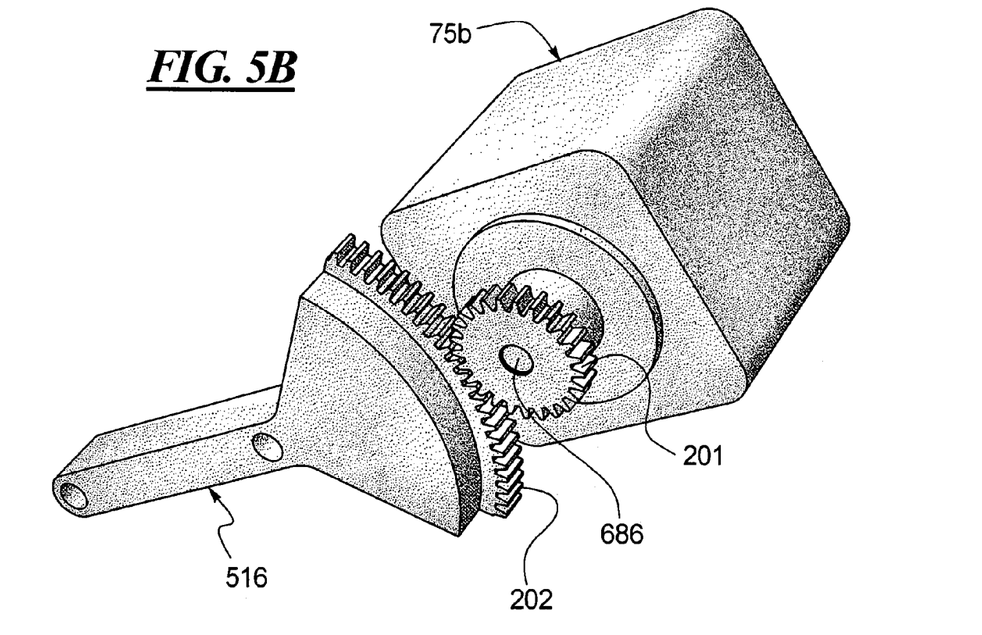
FIG. 5B is a perspective view of an alternative embodiment which includes an arcuate gear segment connected to the upper end of the rear link which is enmeshed with a drive gear mounted on the motor shaft of the motor, all other parts of this embodiment being illustrated in FIGS. 1–5A.
Figure 5C:
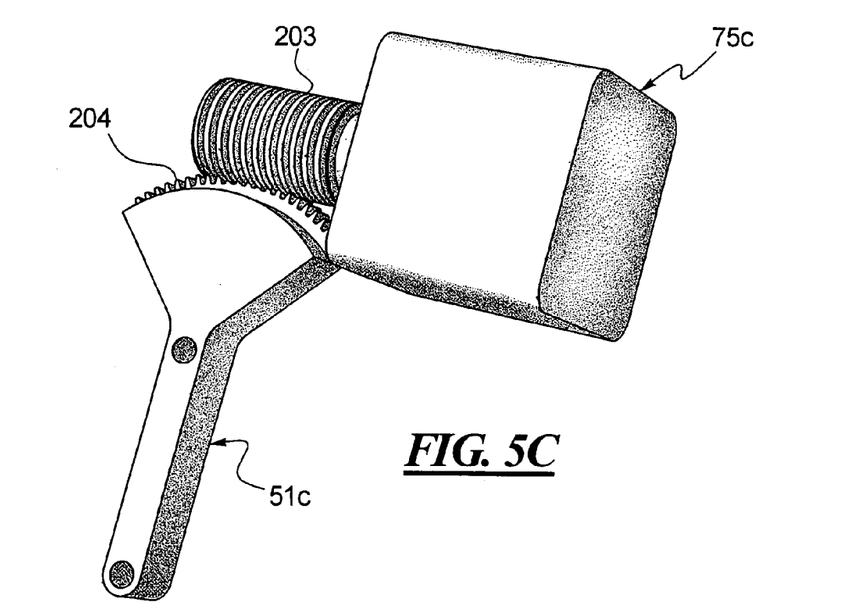
FIG. 5C is a partial perspective view of yet another alternative embodiment wherein a worm is mounted on the motor shaft which is enmeshed with an arcuate worm gear connected to an upper portion of the rear link.

Turning to FIG. 5B, the motor 75b includes a motor shaft 68b that passes through a drive gear 201. The drive gear 201 is enmeshed with an arcuate gear segment 202 connected to the rear link 51b. The rear link 51b is pivotally connected to the pivot plate 43 and holder plate 46 as illustrated in FIGS. 2–5A. Rotation of the motor shaft 68b and drive gear 201 results in the same movement of the apparatus as illustrated in FIGS. 2–5A. Similarly, turning to FIG. 5C, the motor 75c includes a drive shaft (not shown) that is connected to a worm 203 which, in turn, is enmeshed with an arcuate worm gear 204 connected to an upper portion of the rear link 51c.

Figure 6:
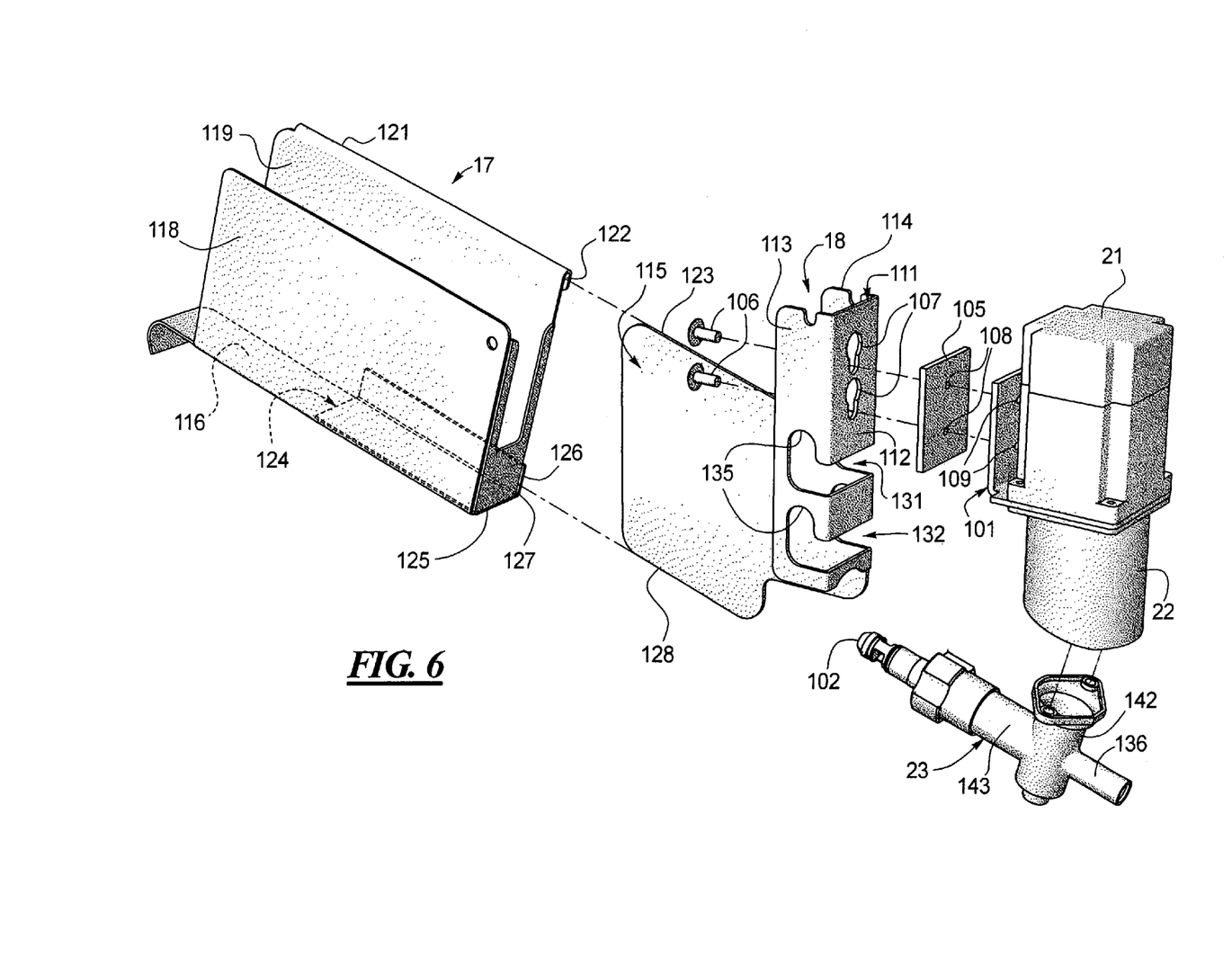
FIG. 6 is an exploded view illustrating the relationship between a holder, bracket, motor and nozzle of the dispensing apparatus disclosed herein.
Figure 7:
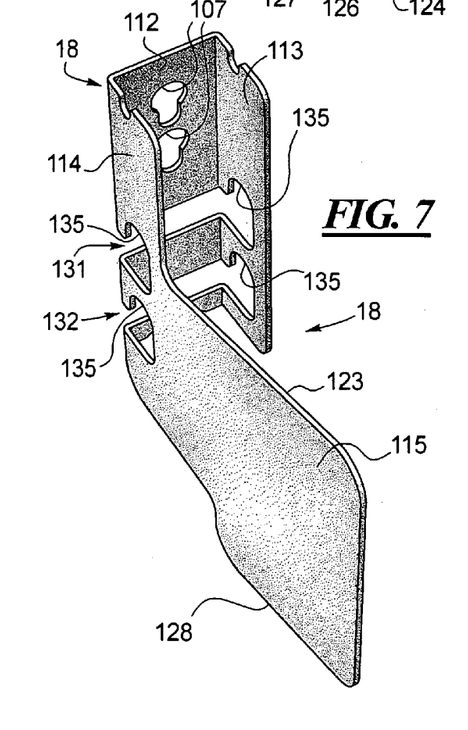
FIG. 7 is a perspective view of the improved bracket of the dispensing apparatus disclosed herein.
Figure 8:
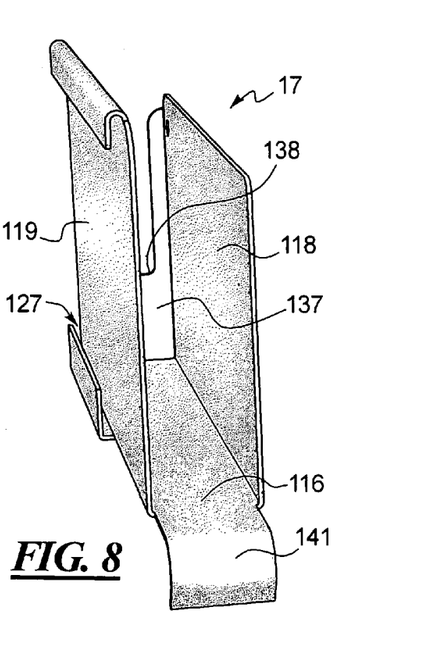
FIG. 8 is a perspective view of a holder for supporting a fluid component provided in either a flexible bag as shown in FIG. 10 or a bag enclosed within a box as shown in FIG. 1.
Figure 9:
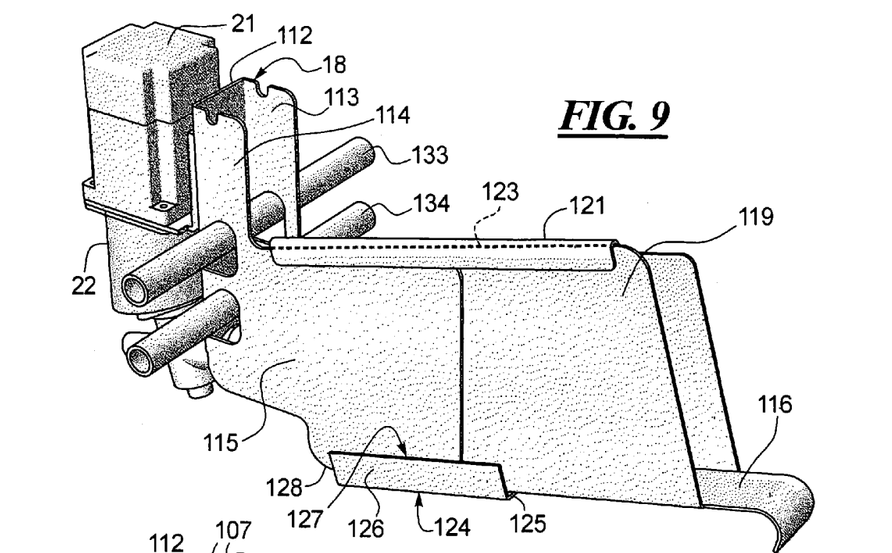
FIG. 9 is a perspective view illustrating the relationship between the bracket illustrated in FIG. 7 and the cross beam disposed within the cabinet illustrated in FIG. 1 and also the relationship between the holder illustrated in FIG. 8 and the bracket illustrated in FIG. 7.
Figure 10:
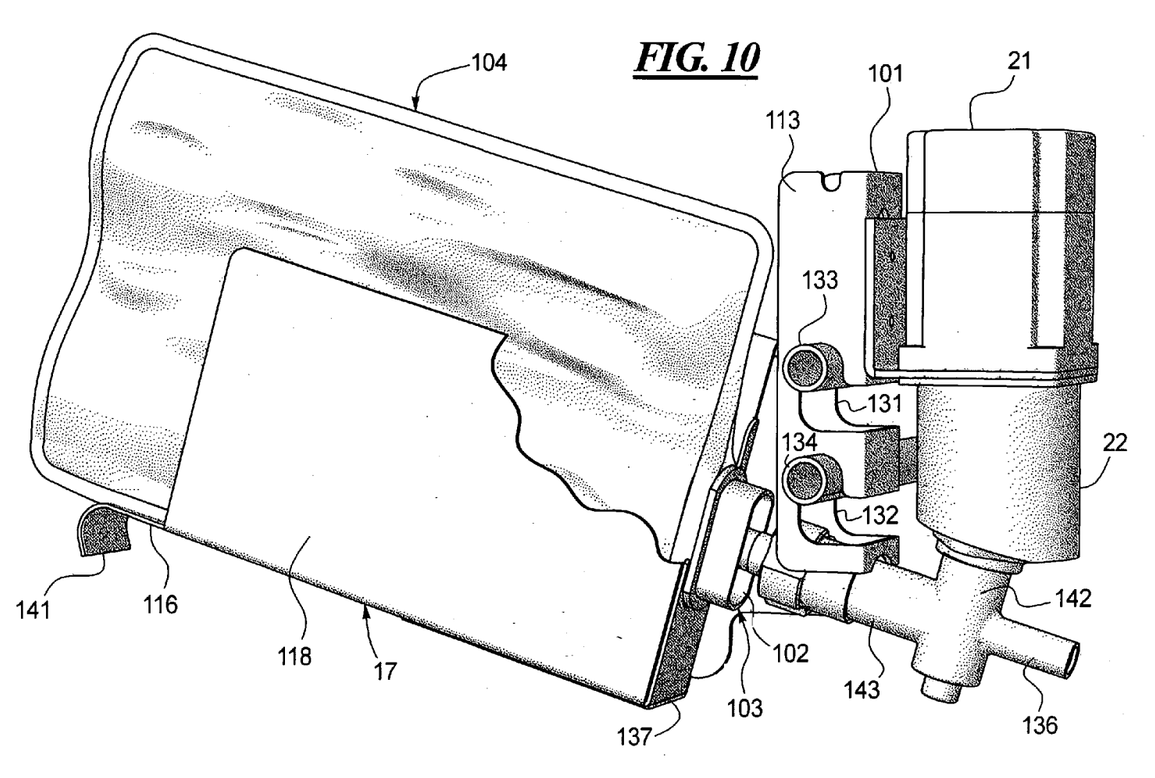
FIG. 10 is a perspective view of a bag containing a fluid component, a holder, a bracket, a motor, a pump and a nozzle connecting the pump to the fluid bag.
Figure 11:
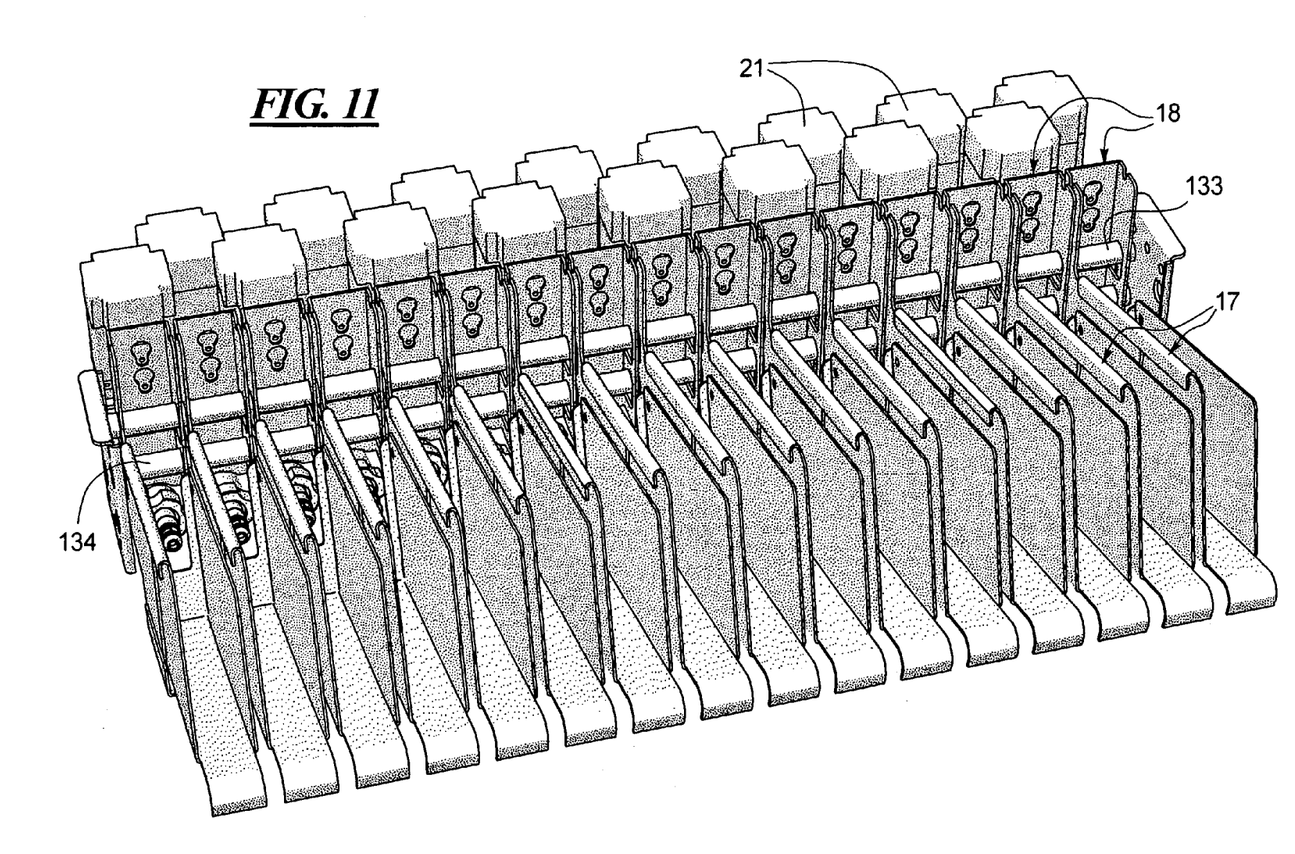
FIG. 11 is a perspective view of a staggered arrangement of a plurality of brackets, holders, motors and pumps using two cross beams for slidably and detachably supporting a plurality of brackets which, in turn, are connected to a plurality of motors, pumps and nozzles and which also support a holder for supporting various fluid components.

Turning to FIG. 6, the relationship between a motor 21, pump 22, nozzle assembly 23, bracket 18 and holder 17 is illustrated with additional references to FIGS. 7–9. The motor 21, which is also preferably a stepper motor is mounted to a pump 22, in this case, a nutating pump, in a conventional fashion using a mounting plate 101. The pump 22 is connected to a nozzle outlet 23 which includes an inlet nozzle 102 that is mateably received in an outlet port 103 of a fluid-containing bag 104 as shown in FIG. 10. The motor 21, pump 22 and nozzle assembly 23 are supported by and connected to the bracket 18. In a preferred embodiment, a vibration-absorbing pad 105 is disposed between the motor 21 and pump 22 and the bracket 18. The use of the pad 105 is advantageous when considering the number of motors 21 and pumps 22 that may be employed in the system 10 as shown in FIG. 1. Specifically, with two rows of pumps 21 and motors 22 as shown in FIG. 1 and even with the possibility of the staggered arrangement shown in FIG. 11 that provides for the inclusion of still additional motors 21 and pumps 22, vibrations and noise can be a problem if the system 10 is used in a retail environment as discussed below. Thus, the motor 21 and pump 22 as shown in FIG. 6 is preferably connected to the bracket 18 by way of the fasteners 106 that extend through the slotted openings 107 of the bracket 18 and through the openings 108 of the pad and 109 of the mounting plate 101 as shown in FIG. 6.

The bracket 18 essentially includes a u-shaped body 111 that includes a rearwall 112 disposed between and connected to sidewalls 113, 114. The sidewall 114 is connected to a forwardly extending arm 115 that engages and supports the holder 17 as follows. Specifically, the generally u-shaped holder 17 includes a bottom wall 116 disposed between and connected to opposing sidewalls 118, 119. The sidewall 119 includes an upper edge 121 that is folded over to form an elongated slot 122 for receiving the upper edge 123 of the arm 115 of the bracket 18. Similarly, the bottom wall 116 is connected to an additional bottom L-shape plated 124 that includes a lower horizontal section 125 and a vertical section 126. The vertical section 126 is spaced apart from the sidewall 119 of the holder 17 so as to provide an additional slot 127 for receiving the lower edged 128 of the arm 115 of the bracket 18. Thus, the holder 17 simply slides onto the arm 115 of the bracket 18 as shown in FIG. 9.

Referring to FIGS. 6 and 7, the bracket 18 includes two slots 131, 132 that extend through the rearwall 112 and into the sidewalls 114, 113 of the bracket 18. The slots 131, 132 receive the crossbeams 133, 134, respectively. The crossbeams 133, 134 are suspended between the sidewalls 13 of the cabinet 12 (FIG. 1) in a conventional manner. In the embodiment illustrated in FIG. 1, two sets of crossbeams 133, 134 would be required as there are two rows of motors 21, pumps 22 and fluid containers 16 as shown in FIG. 1. To slideably mount a bracket 18 on the crossbeams 133, 134, the brackets 18 are pushed over the crossbeams 133, 134 with the crossbeams passing through the rearwall 112 of the bracket 18. Then, downward pressure is applied to the bracket 18 so that the crossbeams nest in the shaped recesses shown at 135 in FIGS. 6 and 7. Finally, referring to FIG. 6, it will be noted that the nozzle inlet 102 serves as an inlet port for the pump 22 and the port 136 serves as an outlet port which is connected to a flexible conduit 19 (FIG. 1) which is connected to a block 34 or directly to the manifold 35 if a block 34 if not utilized.

Turning to FIG. 8, the fluid package holder 17 may also include a rearwall 137 having a recess 138 therein for accommodating the outlet port 103 of the fluid bag 104 as shown in FIG. 10. A front tab 141 of the bottom wall 116 may also include the down-turned configuration shown in FIG. 8 to facilitate the insertion of a bag into the holder 17 and also to serve as a handle for the operator.

FIG. 10 illustrates the connection between the fluid bag 104 and the pump 22. Typically, the fluid bag 104 will be accommodated in a box-like structure such as that shown in 16 in FIG. 1. Further, because of the slideable mounting of the brackets 18 on the crossbeams 133, 134, it will be noted that the spacing between adjacent fluid bags 104 and pumps 22 may be adjusted with respect to each other within the cabinet 12. Also, modification to the nozzle assembly 23, such as lengthening the conduit 143 disposed between the nozzle inlet 102 and the pump intake line 142 provides the ability to arrange the pumps 22 in the staggered configuration illustrated in FIG. 11 thereby enabling a greater number of pumps and therefore a greater number of liquid ingredients on a single set of crossbeams 133, 134.

Thus, the system 10 as illustrated above can be used to prepare a paint or stain sample or other fluid sample using a variety of different ingredients in a fast and efficient manner. A plurality of paint or stain formulations is stored in the memory of the controller 24 and each formulation is associated with a particular identifier. A plurality of different tints or colorants and one or more base materials are provided in fluid reservoirs such as that shown at 104 in FIGS. 10 and/or 16 in FIG. 1. After a consumer has identified a particular color or a paint or a particular color of a stain that he/she desires a sample of, the consumer either directly or a retail technician enters the identifier for the particular color into the system 10 by way of a keyboard 27 or touch-screen monitor 26. The formulation is then retrieved from the memory of the controller 24 and the controller 24 includes software so as to sequentially or simultaneously operate the various motors 21 that control the operation of the pumps 22 that are connected to the particular ingredients in the reservoirs 104 or 16 that are needed to make the selected formulation. The ingredients are then sequentially dispensed into a sample-sized container 11 which has been previously placed into the front 77 of the holding plate 46 and the closure system 36 has previously been moved to the dispensed position shown in FIG. 5 from the closed position shown in FIG. 3. The closure system 36 is then returned to the closed or sealed position shown in FIG. 3 and the user than removes the container, places a cap (not shown) on the container while the system 10 prints out a label 31 from the printer 25 which is then placed on the container 11 for future identification of the color or formula selected. The label 31 may include a bar code 31a or other identifying indicia. The container 11 then may be placed in a shaker or mixer to ensure uniform dispersion of the ingredients disposed within the container.

The consumer then takes the container 11 home and applies the sample contained therein onto a wall or other surface of testing. If the consumer decides that the color selected is acceptable, the consumer then can return to the retail store where the system 10 is located and order a larger quantity of the selected color. The larger quantity may then be produced by the system 10 shown in FIG. 1 or a different comparable system designed specifically for the faster dispensing of larger quantities.

Although only particular embodiments have been illustrated herein, those skilled in the art will realize that changes may be made in form and detail without departing from the spirit and scope of this disclosure which is intended to be limited only by the appended claims.

What is claimed is:

1. A closure system for a fluid outlet of a fluid dispensing apparatus, the closure system comprising:
    a pivot plate comprising a manifold opening for accommodating a manifold, the pivot plate also comprising a front portion and a rear portion with the manifold opening disposed therebetween, the front portion of the pivot plate being pivotally connected to a front link and the rear portion of the pivot plate being pivotally connected to a rear link,
    the front and rear links also being pivotally connected to front and rear portions of a holder plate respectively to permit pivotal movement of the holder plate below and with respect to the pivot plate, the front portion of the holder plate comprising a container holder, the holder plate also comprising a central opening for accommodating a plug, an upper portion of the rear link being coupled to a motor shaft of a motor wherein axial rotational movement of the motor shaft results in rotational movement of the upper portion of the rear link, the plug having a closed bottom and an open top, the container holder accommodating an open container having an upper rim, the closure system being operable between at least two positions including a dispense position and a closed position, in the closed position, the plug engaging the lower end of the manifold, and rotation of the motor shaft in a first direction results in plug and container being moved downward and rearward from the closed position followed by upward movement until the upper rim of the container engages the manifold and the plug is disposed rearwardly of the manifold thereby placing the system in the dispense position.

2. The system of claim 1 wherein the open top of the plug mateably receives the lower end of the manifold when the system is in the closed position.

3. The system of claim 1 wherein the open top of the plug comprises a seal ring that mateably and sealingly receives the lower end of the manifold when the system is in the closed position.

4. The system of claim 1 wherein the front portions of the pivot and holder plates are connected to two parallel front links.

5. The system of claim 1 wherein the pivot plate is disposed on an upper surface of a support plate that also supports the motor.

6. The system of claim 1 wherein the lower end of the manifold comprises a seal ring that mateably and sealingly receives the open top of the plug when the system is in the closed position.

7. The system of claim 1 wherein the motor is a stepper motor.

8. The system of claim 7 wherein the one rotation of the motor shaft comprises at least 200 steps.

9. The system of claim 7 wherein the one rotation of the motor shaft comprises at least 400½ steps.

10. The system of claim 1 wherein the container holder of the holder plate comprises a horizontal c-shaped opening at the front portion of the holder that frictionally engages the container so that the upper rim of the container is disposed parallel to the open top of the plug.

11. The system of claim 1 wherein the manifold accommodates a plurality of nozzles, each nozzle being connected to a pump, each pump being connected to a flexible package.

12. The system of claim 11 wherein each pump is linked to a controller having a memory, the memory storing a plurality of formulas, the controller also being linked to an input device enabling a user to select from one of said plurality of formulas.

13. The system of claim 12 wherein the controller is linked to a printer, the printer printing a label corresponding to the selected formula and sized to fit on the container.

14. The system of claim 11 wherein the flexible packages are stored in a cabinet disposed below the motor.

15. A paint or stain formulating and dispensing system, the system comprising:

a stationary pivot plate comprising a manifold opening mateably receiving a manifold having a lower end, the pivot plate also comprising a front portion and a rear portion with the manifold opening disposed therebetween, the front portion of the pivot plate being pivotally connected to an upper portion of a front link and the rear portion of the pivot plate being pivotally connected to a middle portion of a rear link, lower portions of the front and rear links being pivotally connected to front and rear portions of a holder plate respectively to permit pivotal movement of the holder plate below and with respect to the pivot plate, the front portion of the holder plate comprising a sample container holder, the holder plate also comprising a central opening for accommodating a plug, an upper portion of the rear link being coupled to a motor shaft of a motor wherein spinning rotational movement of the motor shaft results in an arcuate movement of the upper portion of the rear link to provide horizontal and vertical movement to the holder plate, the plug having a closed bottom and an open top, the container holder accommodating an open container having an upper rim, at least one of the open top of the plug or the lower end of the manifold being connected to a sealing mechanism, the holder plate being operable between at least two positions including a dispense position and a closed position, in the closed position, the plug engaging the lower end of the manifold with the sealing mechanism disposed therebetween and rotation of the motor shaft in a first direction results in plug and container being moved downward and rearward followed by upward movement until the upper rim of the container engages the lower end of the manifold and the plug is disposed rearwardly of the manifold thereby placing the system in the dispense position, and wherein reverse movement of the motor returning the system to the closed position.

16. The system of claim 15 wherein the open top of the plug mateably receives the lower end of the manifold with the sealing mechanism disposed therebetween when the system is in the closed position.

17. The system of claim 15 wherein the open top of the plug is connected to the sealing mechanism which comprises a seal ring that mateably and sealingly receives the lower end of the manifold when the system is in the closed position.

18. The system of claim 15 wherein the front portions of the pivot and holder plates are connected to two parallel front links.

19. The system of claim 15 wherein the pivot plate is disposed on an upper surface of a support plate that also supports the motor.

20. The system of claim 15 wherein the lower end of the manifold is connected to the seal mechanism that comprises a seal ring that mateably and sealingly receives the open top of the plug when the system is in the closed position.

21. The system of claim 15 wherein the motor is a stepper motor.

22. The system of claim 21 wherein the one rotation of the motor shaft comprises at least about 200 steps.

23. The system of claim 21 wherein the one rotation of the motor shaft comprises at least about 400½ steps.

24. The system of claim 15 wherein the container holder of the holder plate comprises a horizontal c-shaped opening at the front portion of the holder that frictionally engages the container so that the upper rim of the container is disposed substantially coplanar with the open top of the plug.

25. The system of claim 15 wherein the manifold accommodates a plurality of nozzles, each nozzle being connected to a pump, each pump being connected to a flexible package containing one of a colorant or a base material.

26. The system of claim 25 wherein each pump is linked to a controller having a memory, the memory storing a plurality of formulas, the controller also being linked to an input device enabling a user to select from one of said plurality of formulas.

27. The system of claim 26 wherein the controller is linked to a printer, the printer printing a label corresponding to the selected formula and sized to fit on the container.

28. The system of claim 27 wherein the flexible packages are stored in a cabinet disposed below the motor.

29. A method for preparing a paint or stain sample comprising:
providing a dispensing system in accordance with claim 15 with the holder plate and plug in the closed position;
storing a plurality of paint or stain formulations in a memory of a controller, each formulation being associated with an identifier;
providing a plurality of colorants and at least one base material in separate reservoirs, each reservoir connected to a separate pump and a separate nozzle, each pump and the motor being linked to the controller;
entering a selected identifier into an input device coupled to the controller;
mounting a sample container onto the container holder;
moving the holder plate and sample container to the dispense position;
dispensing the formula associated with the selected identifier into the sample container;
returning the holder plate and plug to the closed position.

30. The method of claim 29 further comprising linking a printer to the controller and printing a label with indicia identifying the formula dispensed and adhering the label to the sample container.

31. The method of claim 30 wherein the indicia is a bar code and the controller is linked to a bar code reader.

32. The method of claim 31 wherein the method further comprises reading the bar code of a label adhered to a sample container and dispensing a large quantity of the formula associated with the bar code into a non-sample sized container.

33. The method of claim 32 wherein the dispensing of the larger quantity into the non-sample sized container is carried out at a different dispensing system than that used for the dispensing of the sample amount into the sample container.

34. The method of claim 29 wherein the dispensing of the formula comprises dispensing base material first, followed by colorants followed by dispensing of base material last.

* * * * *